P. W. DERHAM.
Paper-Files.

3 Sheets--Sheet 3.

No. 142,213.

Patented August 26, 1873.

Witnesses.
Jas. E. Hutchinson
John R. Young

Inventor.
P. W. Derham, by
Prindle and Co his Attys

UNITED STATES PATENT OFFICE.

P. WILLIAM DERHAM, OF NEW YORK, N. Y.

IMPROVEMENT IN PAPER-FILES.

Specification forming part of Letters Patent No. 142,213, dated August 26, 1873; application filed August 19, 1873.

*To all whom it may concern:*

Be it known that I, P. W. DERHAM, of New York city, in the county of New York, and in the State of New York, have invented certain new and useful Improvements in Paper-Files; and do hereby declare that the following is a full, clear, and exact description thereof, reference being had to the accompanying drawings making a part of this specification, in which—

Figure 1:
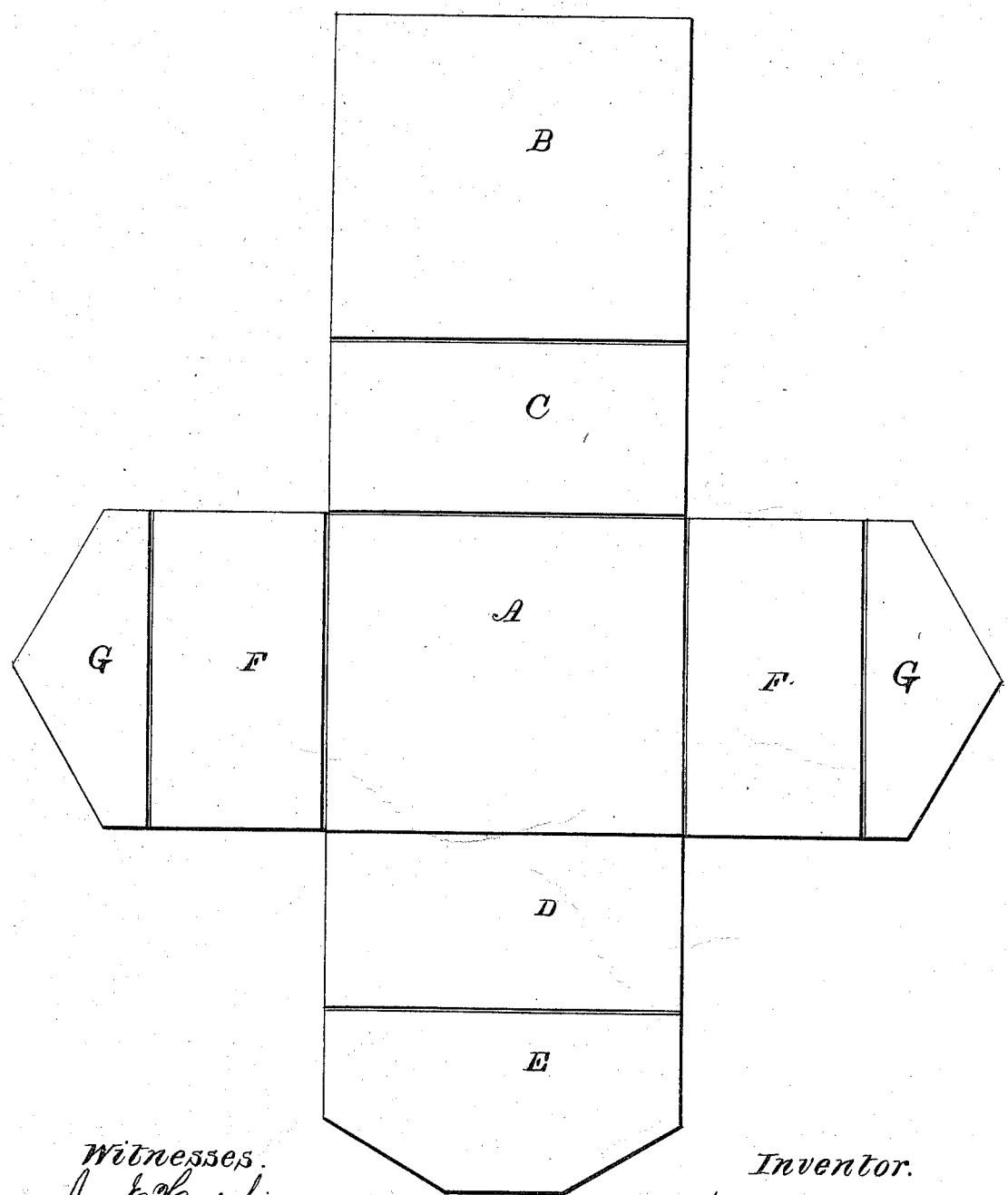
Figure 2:
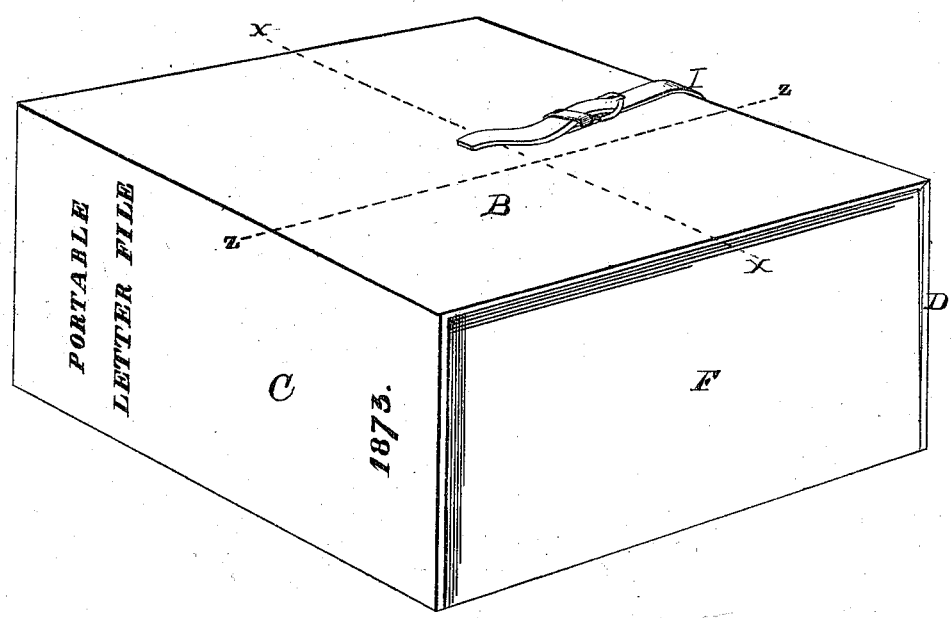
Figure 3:
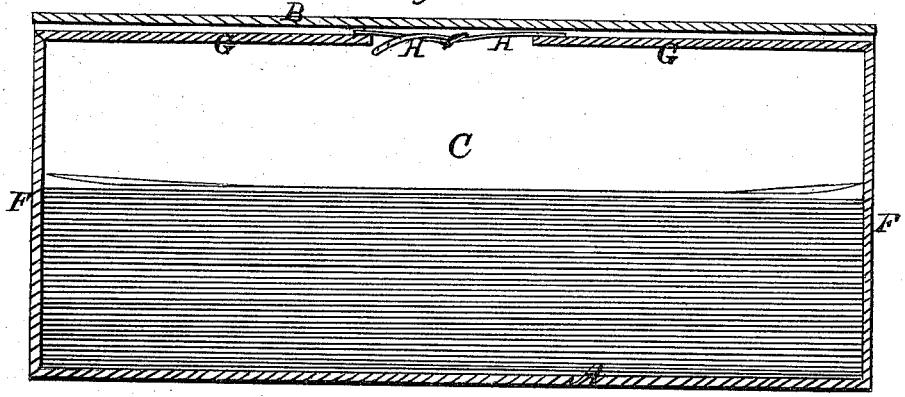
Figure 4:
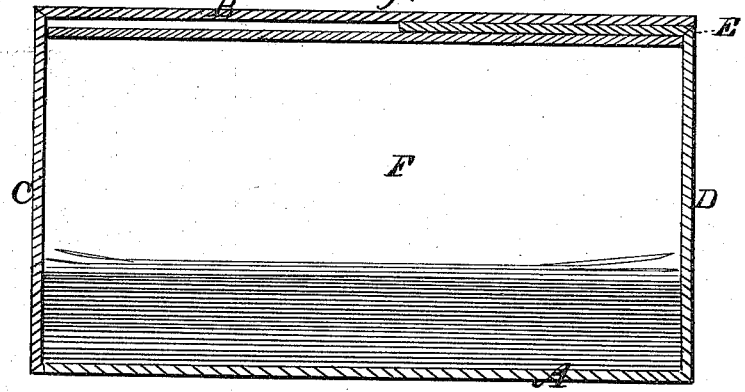

Figure 1 is a plan view of the interior of my device before folding. Fig. 2 is a perspective view of the same as in use; and Figs. 3 and 4 are cross-sections upon lines $x\ x$ and $z\ z$, respectively, of Fig. 2.

Letters of like name and kind refer to like parts in each of the figures.

The design of my invention is to enable letters and other similar papers to be filed and preserved without folding and in a convenient shape for reference; and to this end it consists, as a new article of manufacture, in a letter-file constructed in the manner and for the purpose substantially as is hereinafter specified.

In the annexed drawings, A and B represent the sides of the file, constructed of or from binders' or paste board in the form shown, and connected together by means of a flexible strip of leather or cloth, C, which, when the file is in use, represents its back, and resembles the like portion of a book. Attached by a flexible joint to the outer or front edge of the side A is a strip of pasteboard, D, which corresponds in size and shape to the like features of the back piece C, and is provided upon its outer edge with a flexibly-attached piece, E, that has a shape similar to that of a sealing-flap of an envelope. To each end of the side A is attached a strip, F, and to the outer side of the latter a second strip, G, which strips correspond in width and shape to the like features of the strips D and E, but have lengths just equal to the width of said side.

As thus constructed, the device is ready for use as follows: The papers to be contained within the file are placed upon the side A, the end strips F raised to a vertical position, and the flaps G turned over upon said papers and secured together by means of two ties, H, one of which is attached to each flap. The front strip D is next turned upward and its flap E turned over upon the flaps G, after which the side B is turned over upon said flaps, and secured in place by means of two ties, I, one of which is secured to the front edge of the same, and the other to the corresponding portion of the side A.

The file thus described furnishes a complete protection to its contents, is simple in construction, durable, and can be furnished at a comparatively small cost.

Having thus fully set forth the nature and merits of my invention, what I claim is—

The hereinbefore-described paper-file, consisting of the sides A and B, the back C, the edges D, F, and F, and the flaps E, G, and G, when said parts are constructed and combined in the manner and for the purpose substantially as specified.

In testimony that I claim the foregoing I have hereunto set my hand and seal this 18th day of August, 1873.

P. WILLIAM DERHAM. [L. S.]

Witnesses:
 JOHN DALY. [L. S.]
 JOHN W. CONNY. [L. S.]